O. SMITH.
REVERSIBLE POWER TRANSMISSION MECHANISM.
APPLICATION FILED OCT. 8, 1910.
1,033,284.
Patented July 23, 1912.
2 SHEETS—SHEET 2.
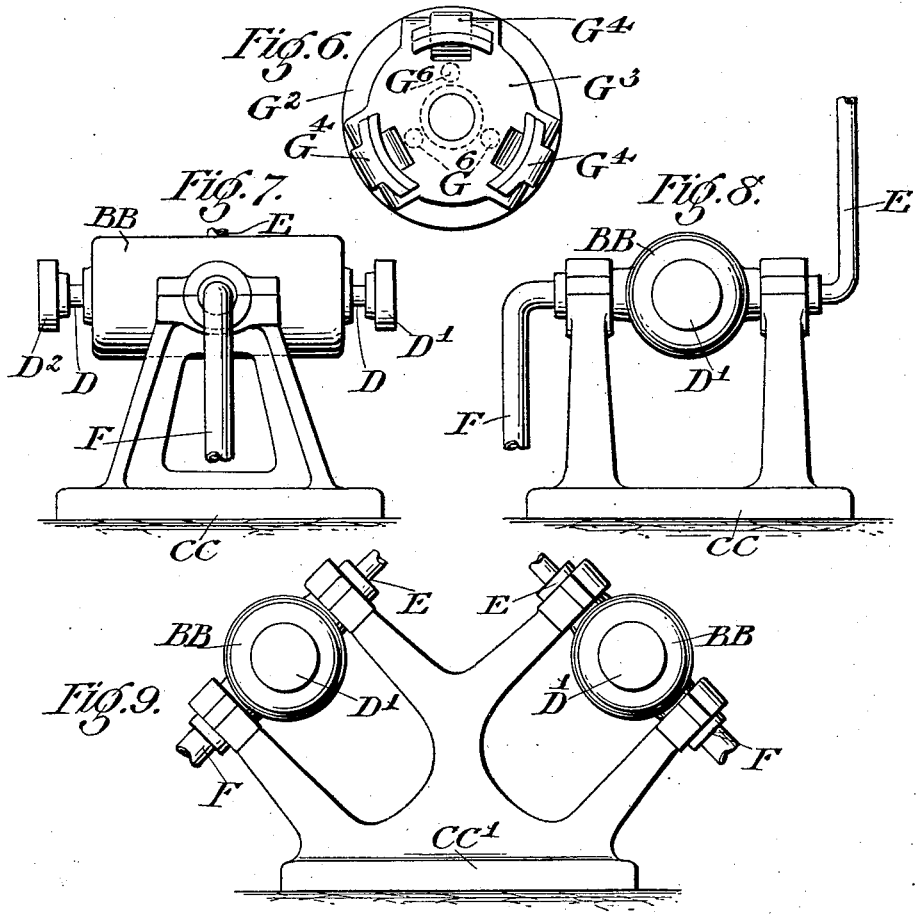

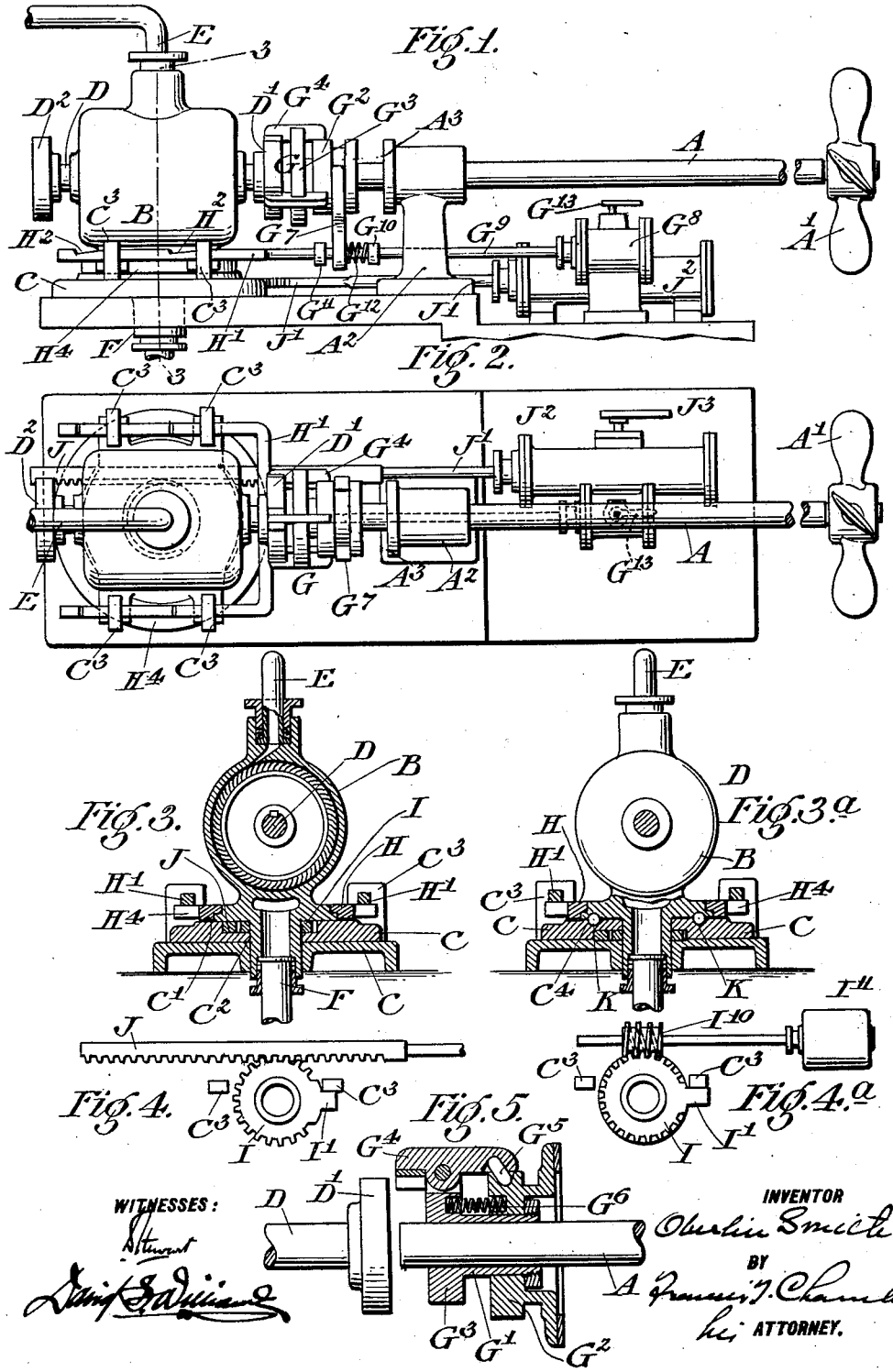

UNITED STATES PATENT OFFICE.

OBERLIN SMITH, OF BRIDGETON, NEW JERSEY.

REVERSIBLE POWER-TRANSMISSION MECHANISM.

1,033,284.

Specification of Letters Patent. Patented July 23, 1912.

Application filed October 8, 1910. Serial No. 585,939.

*To all whom it may concern:*

Be it known that I, OBERLIN SMITH, a citizen of the United States of America, residing in Bridgeton, in the county of Cumberland, in the State of New Jersey, have invented a certain new and useful Improvement in Reversible Power-Transmission Mechanism, of which the following is a true and exact description, reference being had to the accompanying drawing, which forms a part thereof.

My present invention relates to power transmission mechanisms of the kind in which the driven shaft is in operation directly coupled to and turns with the driving shaft of a prime mover of the nonreversible type.

As is well known to those skilled in the art there are many prime movers such as steam, gas and water turbines, impulse wheels and gas and air engines and some steam engines in which the main driving shaft rotates in one direction only with respect to the framework of the prime mover. In many instances, also, it is highly desirable that the driving shaft of the prime mover and the driven shaft should be directly coupled together and it is also desirable to have the driven shaft rotated in both directions. This is particularly true in the case of the prime movers driving the propeller shafts of boats and it is a matter of common knowledge to those skilled in the art that use of such efficient and satisfactory prime movers, as steam turbines and gas engines for driving the propeller shafts of large ships, has been greatly restricted heretofore because of the inability to reverse the direction of rotation of the propeller shafts by simply reversing the direction of rotation of such turbines and engines.

The object of the present invention is to provide an efficient arrangement whereby the driven shaft of a power transmission mechanism may be rotated in either direction by the driving shaft directly coupled to it of a non-reversible prime mover. To accomplish this I provide such a mounting or supporting means for the prime mover that it may be readily shifted to present either end of its driving shaft in position to be coupled to the driven shaft, and provide in conjunction therewith a suitable powerful quick acting clutch mechanism of a kind adapted to be brought into action to couple the driving and driven shafts while said shafts are in relative rotation in either direction, and without imposing an objectionable end pressure on either shaft.

In the preferred mode of carrying out the invention, I so mount the prime mover that it may be rotated relative to a stationary base about an axis perpendicular to and intersecting the axes of the driving and driven shafts.

The invention is particularly available for use in driving battleships and other large ships by means of steam turbines and gas engines but of course, it is not restricted to such use.

The invention is capable of embodiment in many different forms and various provisions may be made for quickly and efficiently coupling and uncoupling the driving and driven shafts and for mounting the prime mover in its supporting means and for shifting the prime mover and securing it in its different operative positions.

The various features of novelty which characterize my invention are pointed out with particularity in the claims annexed to and forming a part of this specification. For a better understanding of the invention, however, and the advantages posessed by it, reference should be had to the accompanying drawings and descriptive matter in which I have illustrated and described several of the forms in which the invention may be embodied.

Of the drawings, Figure 1 is an elevation of a power transmission mechanism in which the prime mover is a steam turbine and the driven shaft is a ship's propeller shaft. Fig. 2 is a plan of the apparatus shown in Fig. 1. Fig. 3, is a section taken on the line 3—3 of Fig. 1. Fig. 3A is a partial sectional elevation taken similarly to Fig. 3, but illustrating a modification of the structure shown in Fig. 3. Fig. 4 is a detached plan of the turbine rotating means. Fig. 4A is a view similar to Fig. 4 showing a different apparatus for the same purpose. Fig. 5 is a partial sectional elevation of the clutch mechanism shown in Figs. 1 and 2, and Fig. 6 is an end elevation of a portion of the clutch mechanism. Fig. 7 is a side elevation, and Fig. 8 an end elevation of a prime mover and supporting means therefor differing in form from those shown in Fig. 1. Fig. 9 is an end elevation of prime movers such as is shown in Figs. 7 and 8 arranged in a different form of support.

In the drawings, and referring first to the construction shown in Figs. 1 to 5 inclusive, A represents a ship's propeller shaft, $A^1$ the propeller secured to one end thereof and $A^2$ one of the housings or supports in which the shaft is journaled.

B represents the body or casing of a steam turbine of a relatively short and thick type, such as the Curtis, and C represents the stationary base or support for the body B upon which the latter is mounted to turn about a vertical axis intersecting the horizontal axis of the main driving shaft D of the turbine. The steam supply pipe E and the exhaust pipe F, in the form shown, are connected to the body B through stuffing box arrangements, the axes of which are coincident with the axis of rotation of the body B relative to its base C.

In the particular form shown in Figs. 1, 2, 5 and 6, the provisions made for quickly coupling and disconnecting the shaft A to whichever end of the shaft D is presented to it comprises a clutch mechanism G mounted on the shaft S and similar clutch disks $D^1$ and $D^2$ secured on the opposite ends of the shaft D. The clutch mechanism G comprises a sleeve G' splined on the shaft A and having a cylindrical body portion on which is mounted a sliding collar $G^2$ and formed also with a head $G^3$ at the end of the body $G^1$ adjacent the prime mover. The clutch jaws $G^4$ are pivotally mounted in the head $G^3$ and links or struts $G^5$ are provided for forcing the gripping ends of the jaws $G^4$ inward as hereinafter explained. The struts $G^5$ each have one end received in a socket formed in the tail of the corresponding jaw $G^4$ and the other end received in a socket formed in the sleeve $G^2$. Springs $G^6$ acting between the head $G^3$ and the sleeve $G^2$ tend to separate the head $G^3$ and the collar $G^2$ and hold the latter against a nut threaded on the end of the sleeve $G^1$. The collar $G^2$ is grooved to receive the prongs of a yoke or fork shaped member $G^7$ by which the clutch mechanism is moved axially of the shaft A, and the jaws $G^4$ are caused to grip and release the appropriate disk $D^1$ or $D^2$. When the yoke $G^7$ is moved toward the turbine the relative position of the clutch parts, as shown in Fig. 5, remains unchanged until the head $G^3$ engages the end of the disk, then further movement of the collar $G^2$ results in forcing the gripping ends of the jaws $G^4$ into engagement with the periphery of the disk $D^1$ or $D^2$. The gripping ends of the jaws $G^4$ may be lined with wood, fiber, leather or other friction giving material, as is usual in friction clutches.

To operate the clutch mechanism, a power transmission mechanism may be employed, as shown in Figs. 1 and 2. This comprises a cylinder $G^8$, the piston rod $G^9$ of which passes through the yoke member $G^7$ and is formed with collars $G^{10}$ and $G^{11}$ on opposite sides of the member $G^7$ and stiff spring $G^{12}$ acting between collar $G^{10}$ and member $G^7$ to form means for causing the member $G^7$ to move generally with the rod $G^9$ while allowing a limited relative movement for a purpose hereinafter described. $G^{13}$ represents the handle of a valve for admitting pressure fluid to the cylinder $G^8$ to move the piston therein in one direction or the other as is desired. To check the rotation of the propeller shaft when uncoupled from the turbine the clutch collar $G^2$ may have its rear end arranged to engage a friction surface $A^3$ formed on the housing $A^2$ so that when the clutch mechanism is fully retracted the clutch mechanism by reason of its engagement with the surface $A^3$ serves as a brake to slow down shaft A.

With the particular construction shown in Figs. 3 and 4 the base member C is provided with a horizontal bearing surface $C^1$ and a cylindrical bearing surface $C^2$ engaged by corresponding surfaces of the turbine housing or body B. A cap member H suitably secured to the base C assists in holding the body of the turbine on its base. To rotate the turbine about its vertical axis, a gear I, coaxial with said axis and surrounding and secured to the lower trunnion like portion of the turbine is received in a suitable recess formed in the base member C. In mesh with the gear I is a rack J attached to or forming an extension of the piston rod $J^1$ projecting from an operating cylinder $J^2$. As shown the cylinder $J^2$ is located beneath and forms a support for the cylinder $G^8$.

$J^3$ represents the handle of a valve mechanism for controlling the admission of pressure fluid to the ends of the cylinder $J^2$ to thereby cause the piston within the cylinder to be moved and the turbine rotated about its vertical axis. To insure that the turbine when moved shall be brought into the position in which its shaft is in alinement with the propeller shaft suitable provisions should be made. In the construction shown these provisions include stops $C^3$ in Fig. 4 formed on the member C and projecting into position to be engaged by the appropriate side of the lug $I^1$ formed in the gear I.

To facilitate the rotation of the turbine, means may be provided to reduce the frictional retardation to such movement. One means for this purpose is shown in Fig. 3A wherein the turbine body B rests upon balls K received in a channel or raceway $C^4$. Suitable means for quickly and positively clamping the member H and therethrough the turbine body to the base C may well be employed, and in the construction shown in Figs. 1 to 6 I have provided means for this purpose comprising a bifurcated sliding member H¹ provided with upper wedge surface at H² which coöperate with the wedge surfaces of slotted stops C³ carried by the base. The member H¹ bears against an opposed pair of ears H⁴ of the member which projects between the stops C³. To slide the member H¹ back and forth to thereby clamp member H in place and release it, I may connect the member H to the piston rod J¹. The spring connection between the rod G⁹ and the collar G⁷ permits of the necessary relative movement to insure the proper clutch engagement and the proper clamping of the member H to the base. Other means may be used in place of the spur and rack gear arrangement for rotating the turbine body shown in Fig. 4 and in Fig. 4ᴬ I have shown one form of apparatus in which the mutilated gear I attached to the turbine body is driven with a worm I¹⁰ rotated by a small reversible auxiliary prime mover I¹¹.

With the construction shown in Figs. 1 to 6 inclusive, it will be apparent that the operation of reversing the direction of rotation of the propeller shaft is a simple and easy one which can be carried out in a very small period of time. To accomplish the reversing action it is necessary only to disconnect the clutch mechanism and, while manipulating it, to slow down the propeller shaft, rotate the turbine body about its vertical axis through an angle of 180° and then manipulate the clutch mechanism to couple the propeller shaft to the end of the driving shaft then presented to it. While it is in general desirable to slow down the turbine as much as is readily possible during the rotation of the turbine body it is not essential that the turbine shaft should stop rotating to permit the reversing operation to be completed for the clutch mechanism disclosed may be brought into operation and quickly operated to lock the turbine and propeller shafts together regardless of whether or not either the turbine shaft or the propeller shaft is in rotation, as both ordinarily will be in many cases, the propeller shaft because it is still running under its own momentum or because of the motion of the ship through the water. While the particular clutch mechanism disclosed is not the only one which may be used for the purpose, it possesses the characteristics necessary for the full use of the invention, to wit, it is quick and powerful in its action and operates without imposing any substantial end thrust upon either shaft as is the case with an ordinary type of friction clutch in which the engaging surfaces are radial or at an acute angle with the axes of the shafts coupled. Furthermore the clutch mechanism disclosed may be readily brought into action while the shafts being coupled are in relative rotation in either direction. It will be understood of course, that various gages, oiling and like provisions pertaining to the turbine may be mounted on the turbine body to rotate with it in the reversing operation.

Figs. 7 and 8 illustrate a form of mounting which may be employed with a relatively slender and elongated turbine body such as is employed in the Parsons turbine. In this form the turbine body B B is provided with horizontally extending trunnions journaled in arms or brackets extending upward from the body of the base member C C. In some installations it may be advantageous to mount the turbine body to turn about an axis which is neither horizontal nor vertical, and in Fig. 9, I have illustrated a construction differing from that shown in Figs. 7 and 8, only in the fact that the axis of the trunnions is inclined at an angle of about 45° to the vertical. This arrangement may be of special value in ship installations, for instance, in which two turbines of the Parsons type are arranged side by side, as shown in Fig. 9.

While in accordance with the provisions of the statutes I have herein described the best forms of my invention now known to me, it will be apparent to those skilled in the art that many changes in form may be made without departing from the spirit of my invention, and that certain features of the apparatus disclosed herein may be employed with advantage in some cases, without a corresponding use of other features.

Having now described my invention, what I claim as new and desire to secure by Letters Patent is:

1. A reversible power transmission mechanism comprising in combination a driven shaft, a prime mover having a revoluble driving shaft and provisions for bodily turning said prime mover end for end whereby said driving shaft may be alined with the driven shaft, with either end of the driving shaft in position to be coupled to the driven shaft, and a friction clutch mechanism for coupling the driven shaft to whichever end of the driving shaft is presented to it, comprising similar provisions at the opposite ends of the driving shaft and provisions carried by the driving shaft and adapted to coöperate with the provisions at either end of the driving shaft, the coöperating provisions including a cylindrical bearing surface carried by one of said shafts and means carried by the other shaft adapted to bear radially against said bearing surface.

2. A reversible power transmission mechanism comprising in combination a driven shaft, a prime mover having a revoluble driving shaft and provisions for bodily turning said prime mover end for end whereby said driving shaft may be alined with the driven shaft, with either end of the driving shaft in position to be coupled to the driven shaft, and a friction clutch mechanism adapted to couple said shafts together comprising a disk at each end of the driving shaft, gripping jaws mounted on the driven shaft, and means for moving said jaws axially of the shaft into and out of the plane of the disk carried by the adjacent end of the driving shaft and for moving them radially to grip and release the periphery of said disk.

3. A reversible power transmission mechanism comprising in combination a driven shaft, a prime mover having a revoluble driving shaft, supporting means for the prime mover in which the latter is mounted to turn about an axis transverse to and intersecting the axes of said shafts whereby either end of the driving shaft may be brought into position to be coupled to the driven shaft, means for locking said prime mover and supporting means together when the former is in said coupling position, and clutch mechanism for coupling the driven shaft to whichever end of the driving shaft is presented to it said locking means and clutch mechanism including a common power actuator.

4. A reversible power transmission mechanism comprising in combination a driven shaft, a prime mover having a revoluble driving shaft and provisions including a power operated actuator for bodily turning said prime mover end for end whereby said driving shaft may be alined with the driven shaft, with either end of the driving shaft in position to be coupled to the driven shaft, and a friction clutch mechanism adapted to couple said shafts together without imposing a substantial end thrust on either shaft.

OBERLIN SMITH.

Witnesses:
HUGH L. REEVES,
ANNA A. McGALLIARD.

Copies of this patent may be obtained for five cents each, by addressing the "Commissioner of Patents, Washington, D. C."